(12) United States Patent
Gaudoin

(10) Patent No.: US 7,976,760 B2
(45) Date of Patent: Jul. 12, 2011

(54) METHOD AND DEVICE FOR PRODUCING A STRUCTURE

(76) Inventor: Marcus Gaudoin, Neuhausen ob Eck (DE)

( * ) Notice: Subject to any disclaimer, the term of this patent is extended or adjusted under 35 U.S.C. 154(b) by 0 days.

(21) Appl. No.: 12/509,716

(22) Filed: Jul. 27, 2009

(65) Prior Publication Data

US 2010/0007066 A1 Jan. 14, 2010

Related U.S. Application Data

(63) Continuation of application No. PCT/DE2008/000158, filed on Jan. 30, 2008.

(30) Foreign Application Priority Data

Feb. 2, 2007 (DE) .......................... 10 2007 006 102
Apr. 2, 2007 (DE) .......................... 10 2007 016 188

(51) Int. Cl.
*B28B 7/06* (2006.01)

(52) U.S. Cl. .......... 264/313; 264/314; 264/317; 264/571
(58) Field of Classification Search ........................ None
See application file for complete search history.

(56) References Cited

U.S. PATENT DOCUMENTS

| | | | |
|---|---|---|---|
| 4,854,843 A * | 8/1989 | Takeda et al. ................. | 425/437 |
| 5,213,732 A | 5/1993 | Jevtic | |
| 7,243,478 B2 | 7/2007 | Dawson et al. | |
| 2007/0187865 A1 | 8/2007 | Gaudoin | |

FOREIGN PATENT DOCUMENTS

| | | |
|---|---|---|
| DE | 39 42 485 A1 | 6/1991 |
| DE | 10 2004 046 648 A1 | 3/2006 |
| JP | 11-179716 A1 | 7/1999 |
| JP | 2000-280219 A1 | 10/2000 |
| JP | 2000-334719 A1 | 12/2000 |

* cited by examiner

*Primary Examiner* — Monica A Huson
(74) *Attorney, Agent, or Firm* — Burr & Brown

(57) ABSTRACT

The invention relates to a method and a device for producing a structure made up of at least two bodies in a cavity of a mold defining the structure.

11 Claims, 15 Drawing Sheets

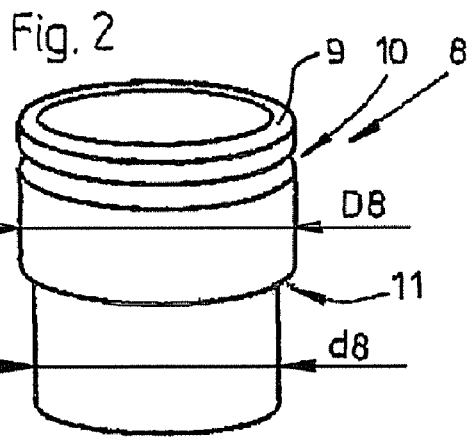
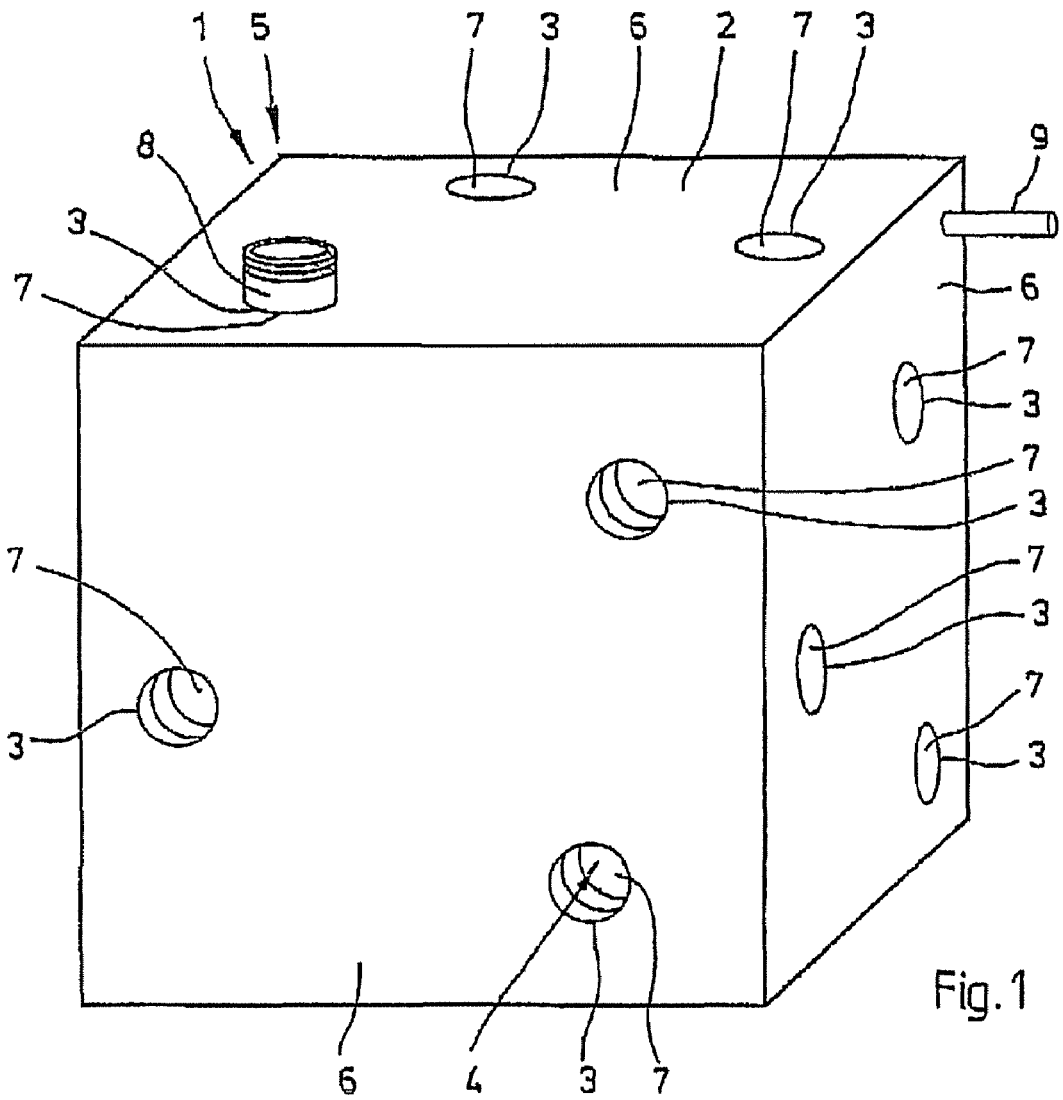

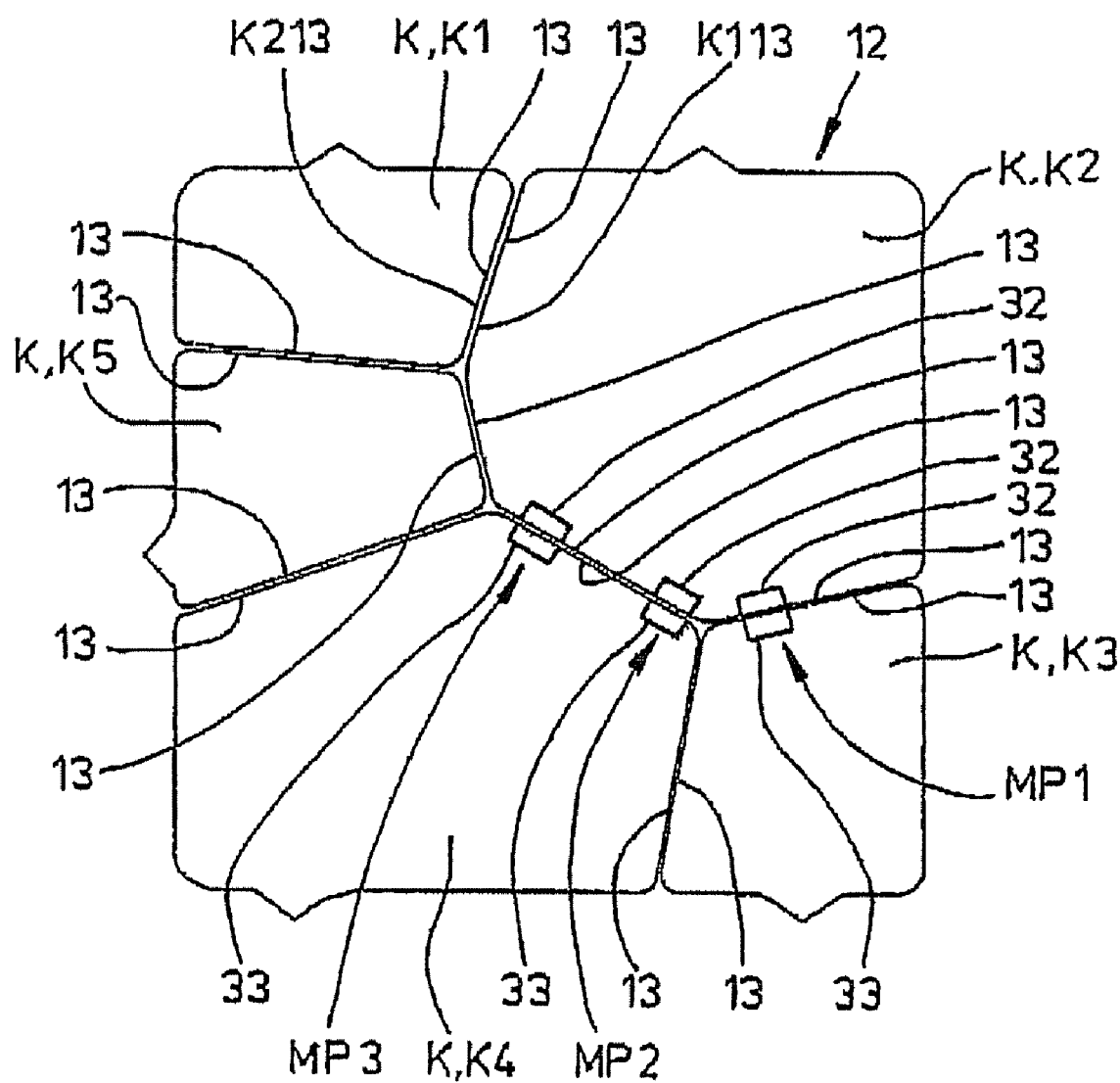

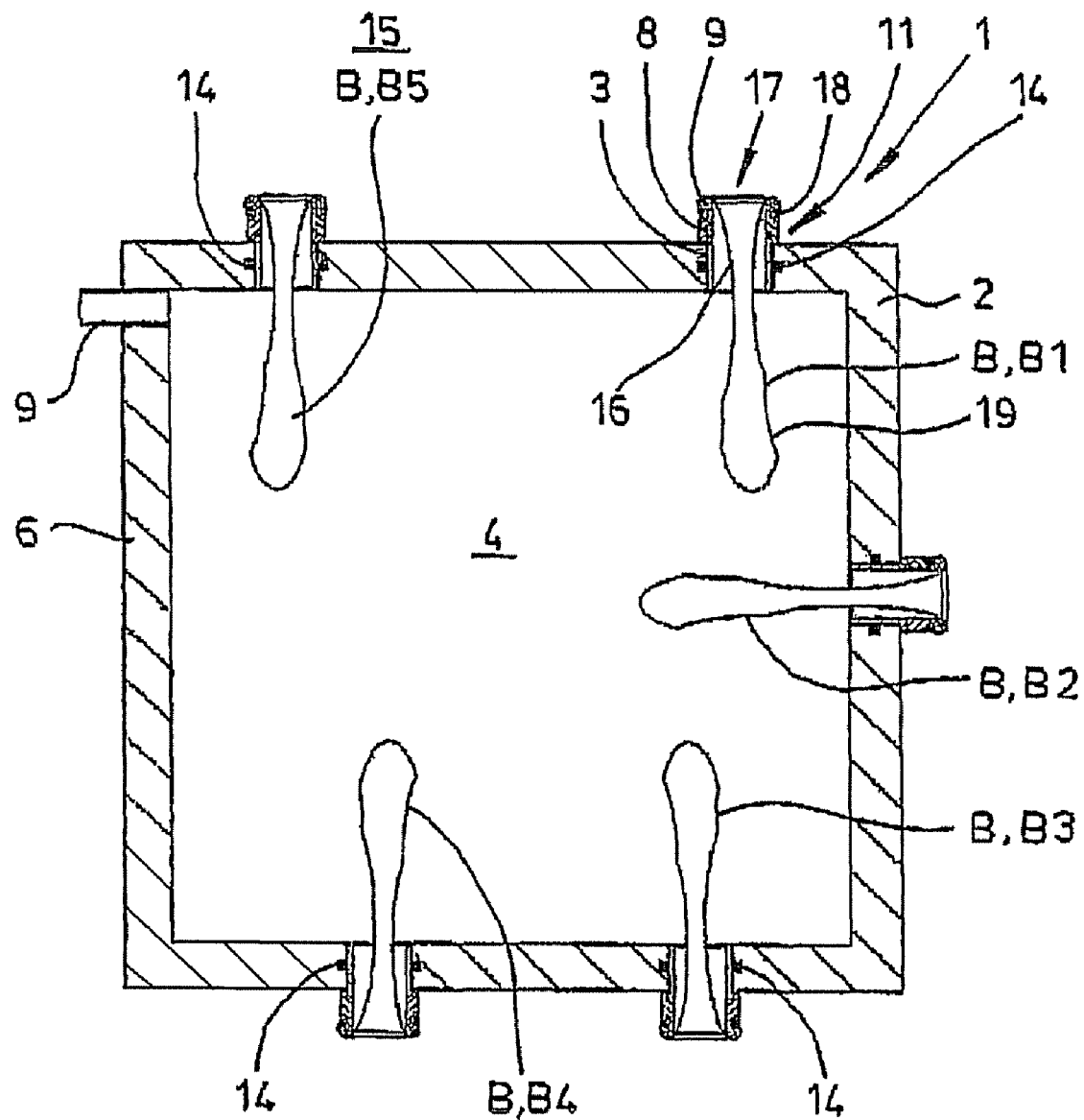

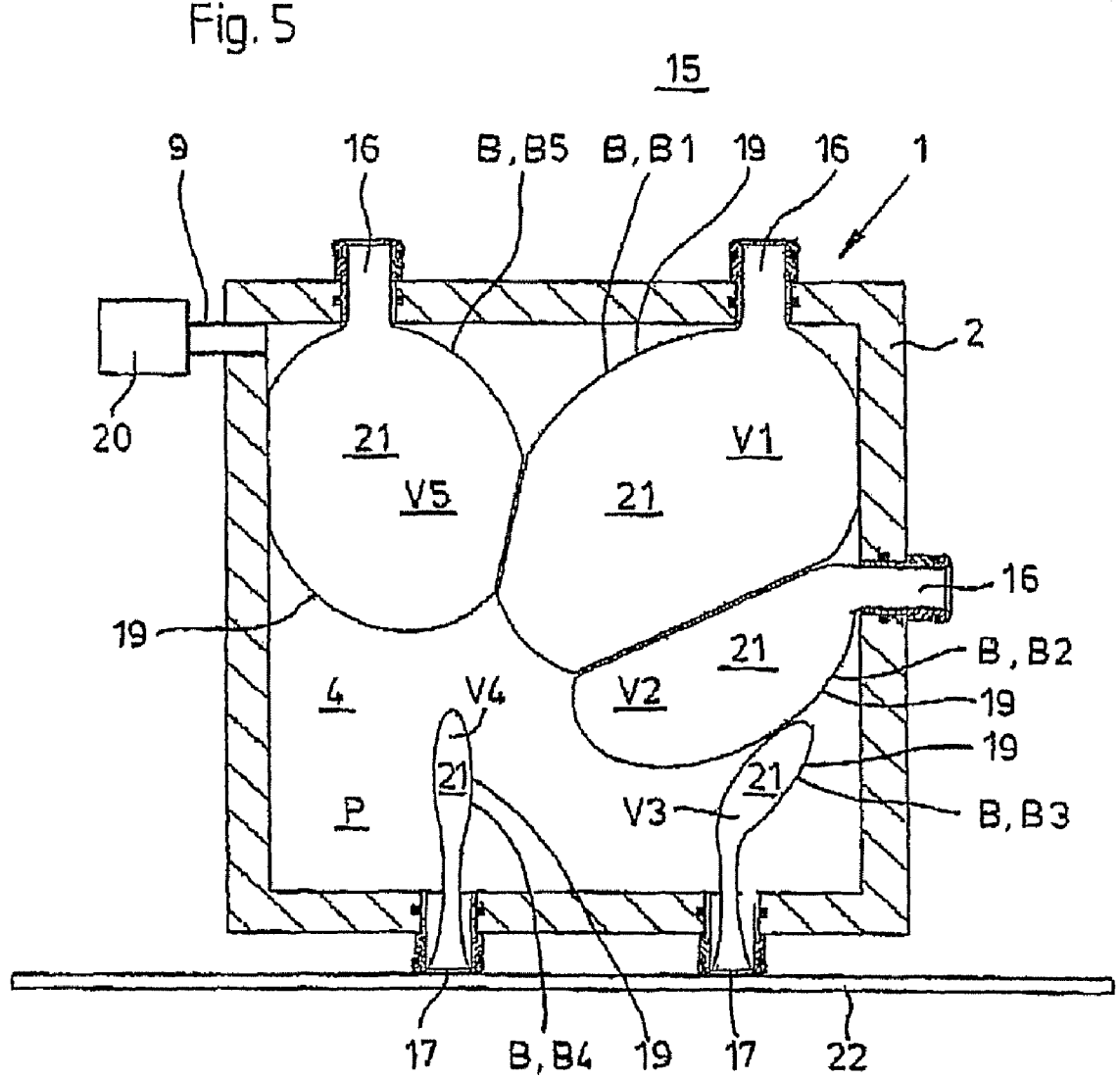

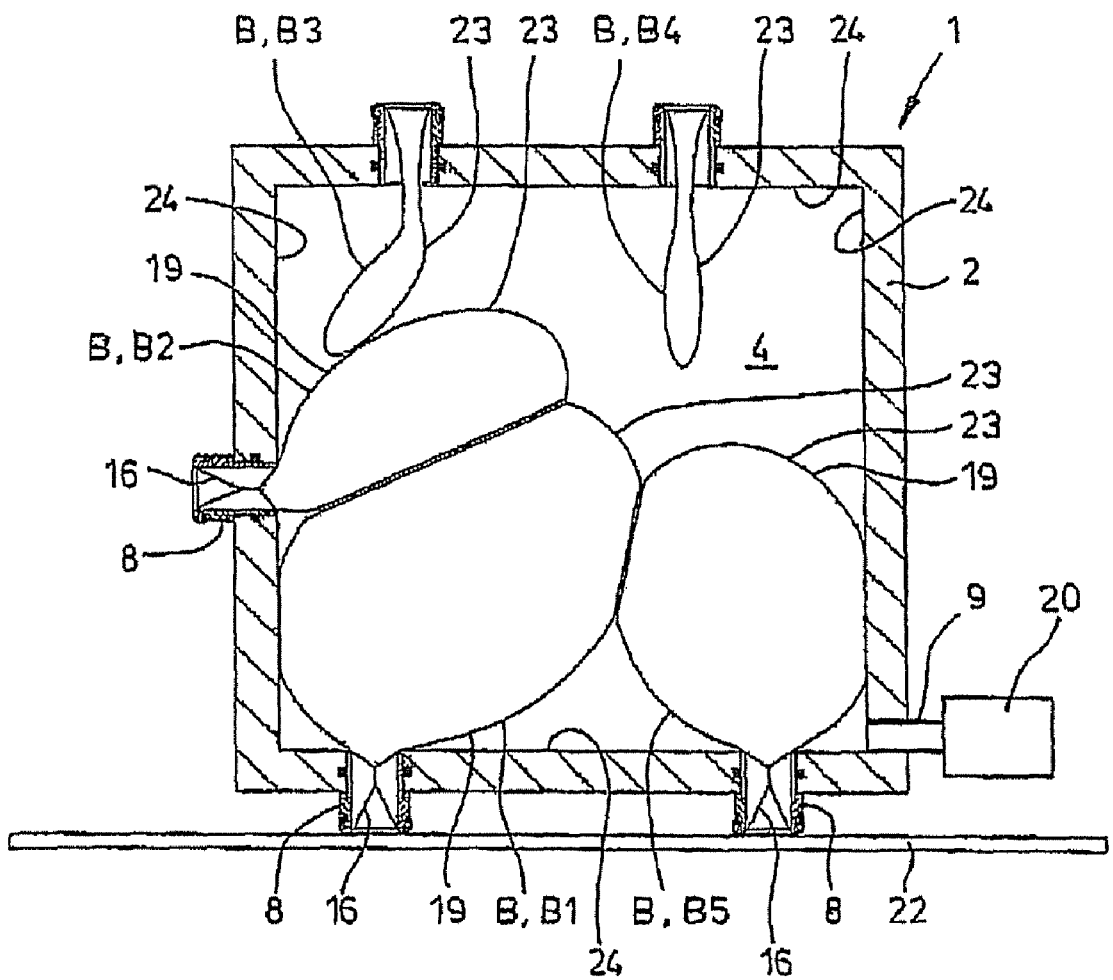

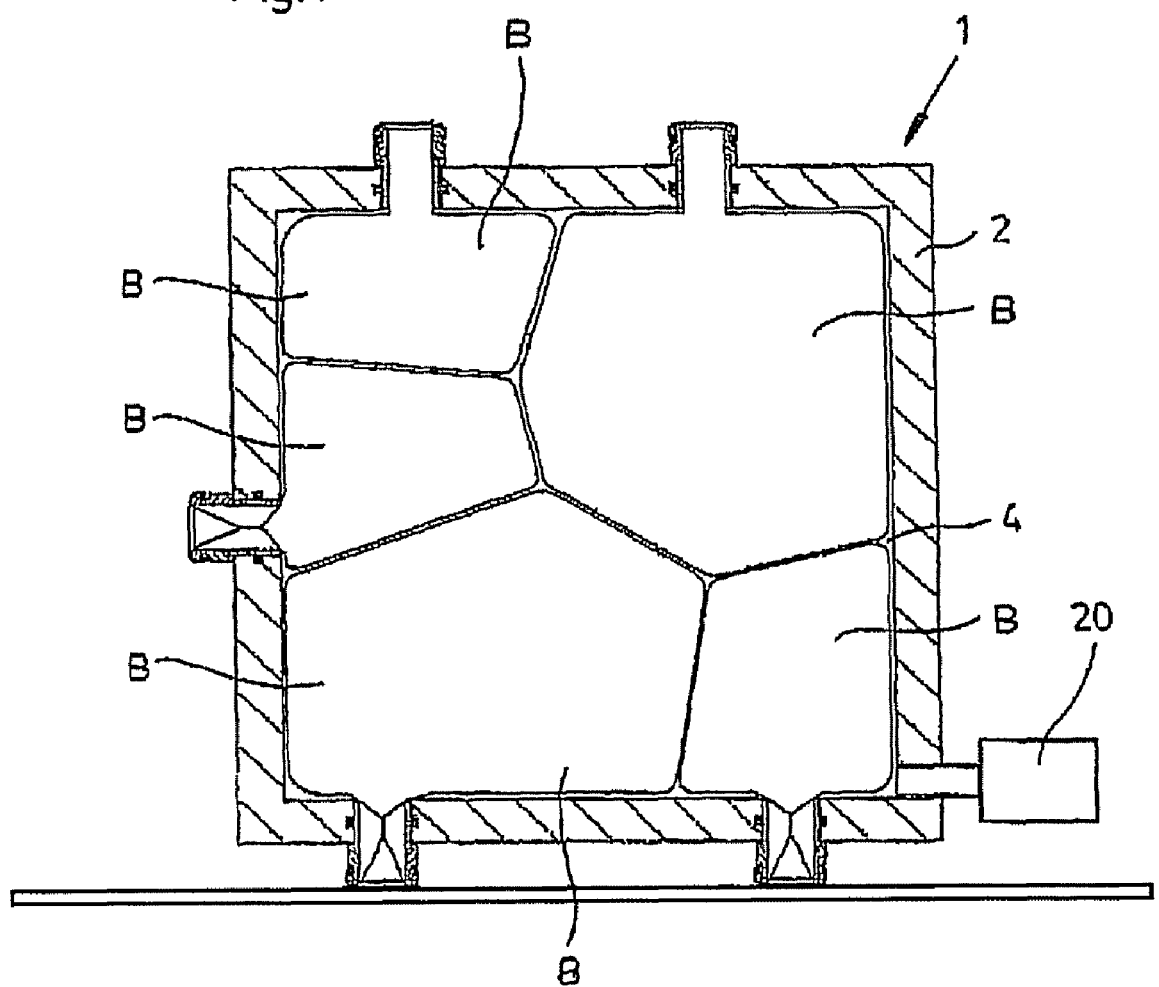

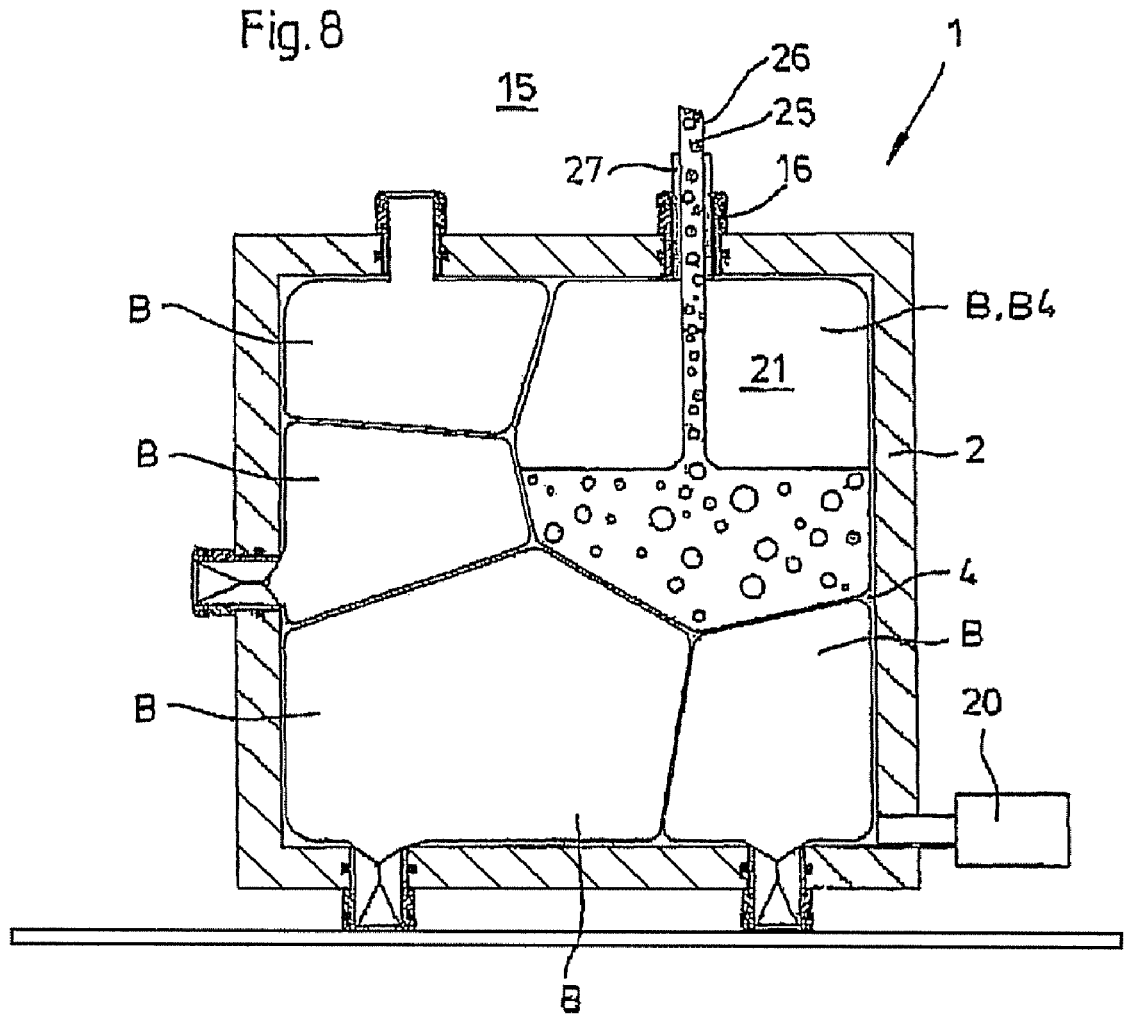

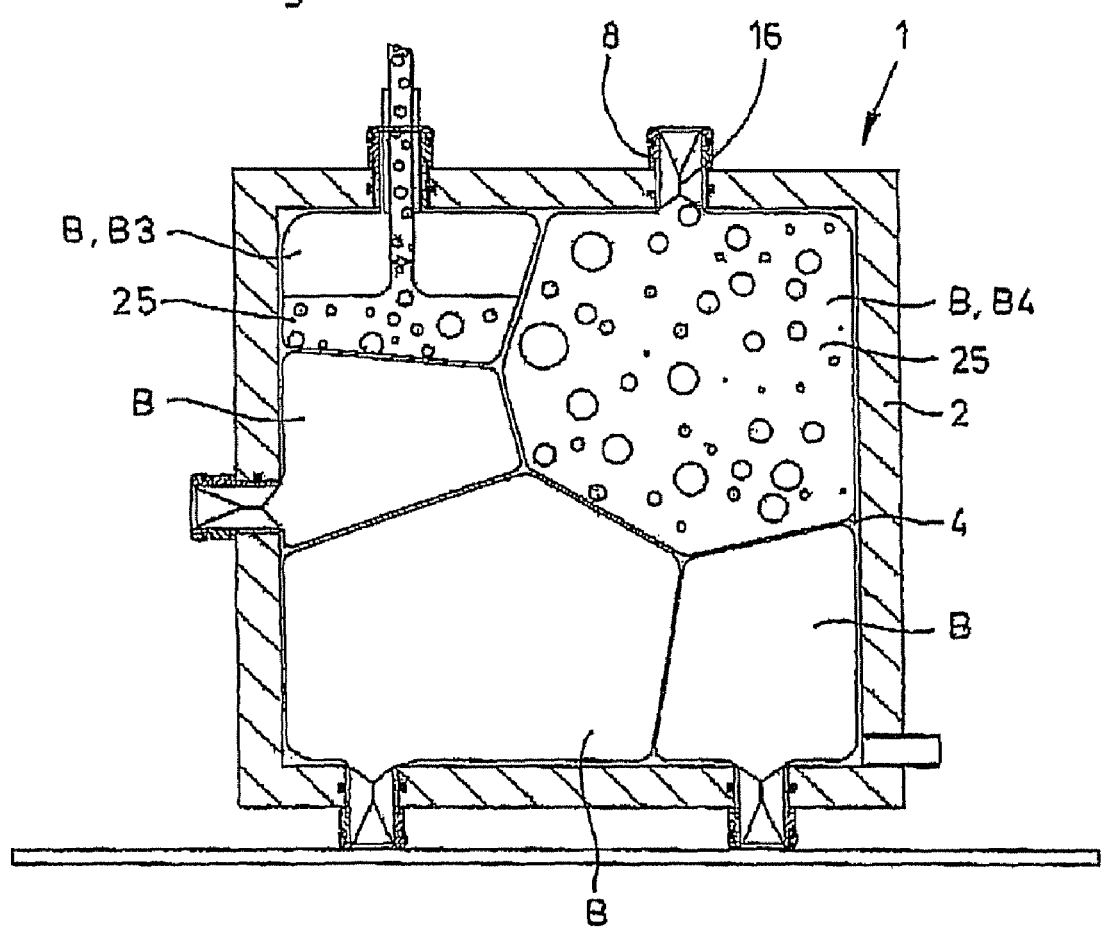

METHOD AND DEVICE FOR PRODUCING A STRUCTURE

CROSS REFERENCE TO RELATED APPLICATIONS

This application is a continuation of International Application No. PCT/DE2008/000158, filed Jan. 30, 2008, which designated the United States, and claims the benefit under 35 USC §119(a)-(d) of German Application Nos. 10 2007 006 102.3 filed Feb. 2, 2007 and 10 2007 016 188.5 filed Apr. 2, 2007, the entireties of which are incorporated herein by reference.

FIELD OF THE INVENTION

The invention relates to a method for producing a structure made up of individual components and to a device for producing such a structure.

BACKGROUND OF THE INVENTION

A method for producing a structure made up of individual components is known from DE 10 2004 046 648 B4, the structure consisting of at least two bodies or components, mutually contacting surface regions of the bodies being adapted to one another in their design, each body being produced in an elastic balloon and the elastic balloons being arranged during the production of the bodies in a cavity of a mold defining the structure.

A device for introducing articles into an air balloon is known from DE 39 42 485 A1. This device for producing a structure comprises a mold having a cavity and at least one aperture leading through a wall of the mold.

SUMMARY OF THE INVENTION

The invention is based on the object of developing a method and a device which allows more individual influencing of the individual bodies and promotes more economical production of structures made up of bodies.

In the method according to the invention for producing a structure, the necks of at least some of the balloons are guided out of the cavity of the mold through apertures in a wall of the mold and these balloons are subsequently filled from outside the mold with a hardenable medium through their necks. As a result of this sequence of the method steps, it is possible to individually fill the individual balloons and to correctively intervene in the mold forming process. The core of the invention is thus a method which does not leave the shaping of the bodies or components or building blocks produced in the individual balloons exclusively to chance, but allows the individual bodies to be acted on and even permits corrections to the volume and/or the shape of the individual bodies.

The invention also makes provision to close the necks or trunks of the balloons after filling. This allows the mold to be individually rotated for the filling of further balloons without the risk of one of the balloons leaking.

Furthermore, the invention makes provision to withdraw the balloons from the bodies after hardening of said bodies. This produces neckless bodies.

According to the invention, provision is made to fill the balloons at pressure. This allows dynamic expanding of the balloons to be obtained using simple means, which expanding takes place as a function of the filling amount, but substantially independently of the position of the balloon.

The invention makes provision for an excess pressure of about 0.2 bar to 0.6 bar for the filling of the balloons. An excess pressure of this degree allows slow yet steady filling affording optimum control of the filling process.

Alternatively, the invention makes provision to generate a vacuum in the cavity of the mold. This causes the balloons to unfold prior to filling. Thus, a first defining of the proportions of the individual bodies is possible even before the filling process, wherein further unfolding or expanding of individual balloons can be temporarily or permanently prevented by closing the respective neck.

The invention makes provision to generate a vacuum in the cavity of the mold at a pressure which is reduced, relative to an ambient pressure, to at least 200 mbar, for unfolding the balloons. This allows optimum control of the expanding process of the balloons.

The invention makes provision to close the mold prior to filling of the balloons. This reliably prevents uncontrolled expanding of a balloon.

In particular, the invention makes provision to introduce the balloons prior to filling through the apertures of the mold. This allows contamination of the cavity or interior of the mold to be effectively prevented, as the cavity remains substantially closed during fastening of the balloons.

Furthermore, the invention makes provision to position at least one article in the mold prior to filling of the bodies, the article being at least partially embedded by the bodies, during filling of the bodies, as a function of its position in the cavity of the mold. This allows individual packaging of one or more articles, as a result of which articles can be surrounded in an almost form-fitting manner. Packaging of this type, made up of a plurality of bodies, can easily be detached from the packaged article or articles.

In the device according to the invention, at least two apertures are provided in the wall of the mold for feeding through in each case a neck of a balloon. This allows the production, in an influenceable manner, of a structure which consists of at least two bodies and in which the bodies influence one another in their shape during the production process and in this case adapt to one another in their shape. The core of the invention is thus a device allowing greater control over a production process in which the bodies of a future structure influence one another in their individual shape or their individual dimensions and their individual volume.

According to the invention, at least one inner wall of the mold is intended to promote sliding of an outer skin of the balloons. This allows steady unfolding of the balloons to be attained when said balloons are forced to unfold as a result of differences in pressure between the interior of the mold and the interior of the individual balloons.

The invention makes provision, in particular, to coat the inner wall of the mold with a liquid or viscous lubricant. An agent of this type is available, for example as soap suds, in an economical and environmentally acceptable form.

Additionally or alternatively, provision is according to the invention made to coat the inner wall of the mold with a solid material having a low coefficient of friction compared to the outer skin of balloons. This allows malfunctions to be effectively avoided when no lubricant is provided.

The invention makes provision to generate a vacuum in the interior of the mold. This allows unfolding of the balloons to be caused without said balloons having to be already filled.

Furthermore, the invention makes provision to associate a valve, which can be used to close the balloon which is guided through the respective aperture, with each of the apertures in the wall of the mold. This allows the expanding process of the individual balloons to be individually controlled.

The invention also makes provision to form the valve by a sleeve, which is rotatably mounted in the wall of the mold, and the neck of a balloon clamped in said sleeve. A valve of this type is easy to handle, as the individual balloon can be closed and opened by way of common rotation of the sleeve with the neck.

Furthermore, the invention makes provision to equip the device with at least one holding means which can be used to fix at least one article in the cavity of the mold, in particular without contacting the wall of the mold. As a result, the bodies, which can be filled after the fixing of the article, can be used to produce packaging or sheathing for the article with a precise fit, wherein the position of the article in the structure formed from the body can be determined in advance.

The invention makes provision to form the holding means by a thread, the thread being fastened to the wall and to the article. Threads require little volume of the cavity of the mold and thus impair the formation of the bodies only minimally during filling.

Finally, the invention makes provision to use one or more elastically extensible threads for fastening the article or articles in the mold. In the case of elastic threads, the bodies are restricted to a particularly low degree during the filling process.

BRIEF DESCRIPTION OF THE DRAWINGS

Further details of the invention are illustrated in the drawings based on schematically illustrated exemplary embodiments, in which:

FIG. 1 is a perspective view of a device according to the invention;

FIG. 2 is a perspective view of a sleeve pertaining to the device shown in FIG. 1;

FIG. 3 shows a structure produced using the device shown in FIG. 1;

FIGS. 4-9 are schematic sectional views of the device shown in FIG. 1 at different moments of the production process;

DETAILED DESCRIPTION OF THE INVENTION

Figure 10:
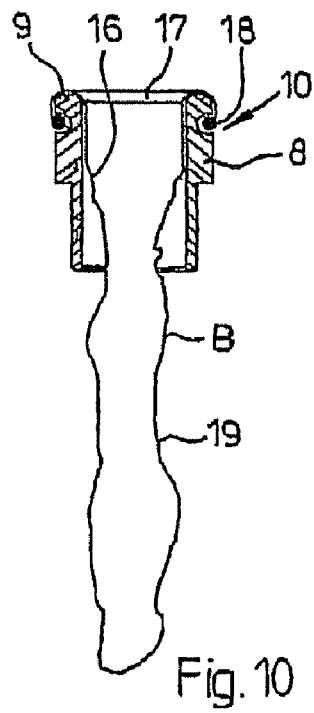
FIG. 10 shows the sleeve which is shown in FIG. 2 and has a balloon fastened therein.

FIG. 1 is a perspective view of a device 1 according to the invention. The device 1 comprises substantially a mold 2. The mold 2 has a large number of apertures 3 leading into a cavity 4 or interior 4 of the mold 2. The mold 2 is designed as a hollow cube 5 having a wall 6. The apertures 3 are designed as through-holes 7 and provided each to receive a sleeve 8. Furthermore, a suction pipe 9 leads into the cavity 4 of the mold 2.

FIG. 2 is an enlarged view of the sleeve 8 shown in FIG. 1. The sleeve 8 has a collar 9 which is formed by a peripheral groove 10. Furthermore, the sleeve 8 has a shoulder 11 at which the sleeve 8 tapers from an external diameter D8 to a smaller external diameter d8. The shoulder 11 prevents the sleeve 8 from slipping through the aperture 3 in the wall 6 of the mold 3 into the cavity 4 thereof (see also FIG. 1).

FIG. 3 shows a structure 12 which was produced in the mold shown in FIG. 1. The structure 12 consists of a large number of individual bodies K, wherein five bodies K1 to K5 may be seen in FIG. 3. The individual bodies K and K1 to K5 respectively are adapted to one another in surface regions 13 where they rest flat against one another. For example, the body K2 is adapted in its surface region K213 to the surface region K113 of the body K1. Pairs of magnets MP1 to MP3, which are each composed of two magnets 32 and 33 positioned in adjacent and mutually abutting bodies K2, K3 and K4 respectively, are arranged in the bodies K2, K3 and K4.

FIGS. 4 to 9 are schematic sectional views through the device 1 shown in FIG. 1 in different, successive stages of the production process. In contrast to FIG. 1, in the illustration of FIG. 4, all the apertures 3 of the device 1 and of the mold 2 respectively are fitted with sleeves 8. In the sectional views of FIGS. 4 to 9, an elastic ring seal 14 may in each case also be seen in each aperture 3. These elastic ring seals 14 hold the sleeves 18 in the apertures 3 in a clamping manner. Furthermore, the elastic ring seals 14 cause sealing of the interior 4 of the mold 2 from an environment 15. FIG. 4 also shows how the suction pipe 9 penetrates the wall 6 and establishes a connection between the interior 4 and the environment 15. The sleeves 8 are fitted with balloons B and B1 to B5 respectively. The respective necks 16 of the balloons B are guided through the sleeves 8, a ring 18, which is located at an opening 17 of the balloon B, being drawn in each case over the collar 9 of the sleeve 8 and lying in the groove 10 of the sleeve 8. At the moment of the production process that is shown in FIG. 4, the bags 19 of the balloons B still sag into the interior 4 of the mold 2. After the hanging of the balloons B into the sleeves 8 and the insertion of the sleeves 8, which are fitted with the balloons B, into the apertures 3 of the mold 2, the cavity 4 of the mold 2 is evacuated through the suction pipe 9. This method step is illustrated in FIG. 5. A pump 20 is connected to the suction pipe 9 for suction-extracting the air from the cavity 4. The apertures 3 are sealed by the sleeves 8 and the balloons B respectively against a subsequent flow of air out of the environment 15 into the cavity 4 of the mold 2. As a consequence of a decreasing pressure p in the cavity 4, the bags 19 of the balloons B1, B2 and B5 expand, air from the environment 15 subsequently flowing through the necks 16 of said balloons into interiors 21 of the balloons B1, B2 and B5 and the volumes V1, V2 and V5 of the balloons B1, B2 and B3 increasing in size. The volumes V3 and V4 of the interiors 21 of the balloons B3 and B4 do not increase under the conditions shown in FIG. 5, as the openings 17 of the balloons B3 and B4 are closed by a rubber plate 22 on which the device 1 rests. Once the balloons B1, B2 and B3 have expanded to a desired size or the desired volumes V1, V2 and V5, said balloons are closed to prevent air from flowing out of or into their interiors 21. The closing is carried out—as shown in FIG. 6—by common rotating of the respective neck 16 with the respective sleeve 8 relative to the expanded bag 19 of the balloon B1 or B2 or B5 which is supported, counter to the rotational movement, on an inner wall 24 of the mold 2. After closing of the balloons B1, B2 and B5, the device 1 is rotated through 180 degrees into the position shown in FIG. 6. Now, the balloons B3 and B4 are no longer closed by the rubber plate 22 and can expand, as the vacuum increases, into the interior 4 of the mold 2, as the balloons B1, B2 and B5 did previously. In order to ensure steady expanding of the balloons B, provision is made to spray outer skins 23 of the balloons B and the inner wall 24 of the mold 2 with soap suds prior to the beginning of the evacuation process.

When the cavity 4 is almost completely evacuated, the balloons B have expanded, for example as shown in FIG. 7. The expansion behavior of the balloons B is dependent on a large number of factors. One important factor is, for example, the wall thickness or the material of the balloons B. Also decisive is, of course, the moment at which the balloon is closed or at which the balloon can start to expand. As soon as the balloons B have filled out the cavity 4 of the mold 2—such as is shown in FIG. 7—the filling of the balloons B can commence (see FIG. 8). The pump 20 is active also during the filling process in order to keep the balloons B in the desired shape or at the desired volume. The balloons B are filled with a medium 25 which can harden, for example as a result of the action of heat, via a pipe 26 which is guided through the neck 16 of the balloon B4 in the interior 21 thereof. The dimensions of the pipe 26 are such that the neck 16 of the balloon B4 does not rest tight against the pipe 26, so that the air which is displaced by the hardenable material 25 can flow out into the environment 15 through a gap 27 positioned between the neck 16 and the pipe 26. The process of filling the balloon B4 is concluded at the moment of the method shown in FIG. 9. After complete filling, the balloon B4 was closed in the known manner by common rotation of its neck 16 with the sleeve 8. At the moment of the method shown in FIG. 9, the balloon B3 is now filled in a comparable manner through the pipe 26. Once all the balloons B are filled and the hardenable material 25 has hardened in all the balloons B, the solid bodies K, which have already been shown in FIG. 3, have been produced in all the balloons B. Once the balloons B have been taken out of the mold and the balloons B have been withdrawn from the solid bodies K, there is then a structure 12 such as is shown in FIG. 3.

Figure 12:
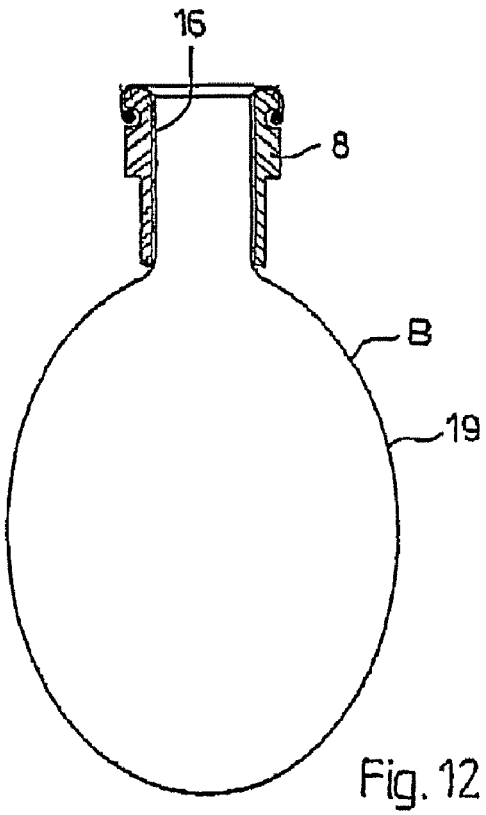
FIG. 12 shows the arrangement shown in FIG. 10, the balloon being expanded.
Figure 11:
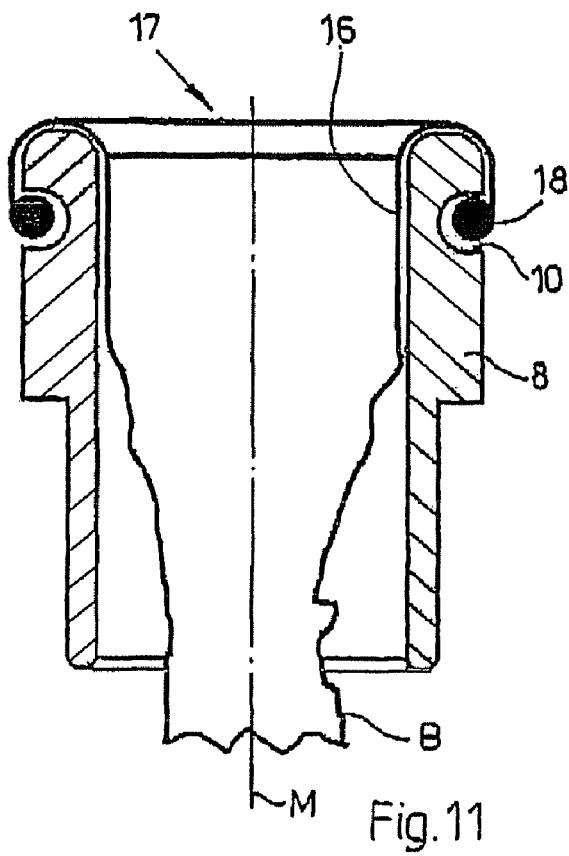
FIG. 11 is a detailed view of FIG. 10.
Figure 13:
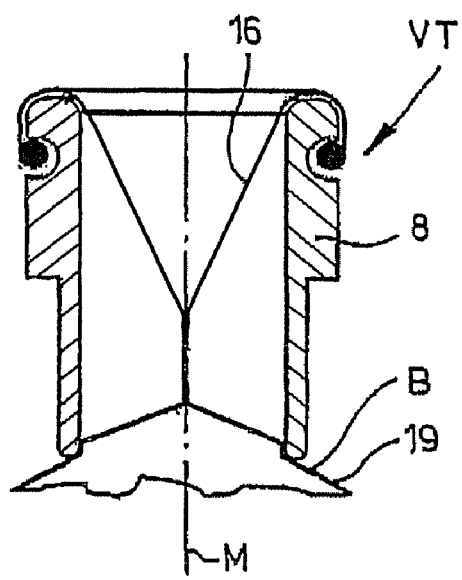
FIG. 13 shows the arrangement shown in FIG. 12, the balloon being closed.

FIG. 10 shows the sleeve 8 which is shown in FIG. 2 and has a balloon B clamped into the sleeve. The balloon B consists substantially of a bag 19 which merges with a neck 16, the neck 16 forming an opening 17 with a ring 18. In order to hold the balloon B on the sleeve 8, the neck 16 of said balloon is drawn over the collar 9 of the sleeve 8, the ring 18 snapping into the groove 10 of the sleeve 8. FIG. 11 is an enlarged view of a detail of FIG. 10. The enlarged view clearly shows how the balloon B is braced to the sleeve 8 by means of the ring 18 of said balloon. This prevents the balloon B and the sleeve 8 from rotating relative to each other about a center axis M. Frictional engagement between the balloon B and the sleeve 8 is important in order to be able to rotate and thus close the expanded balloon B, which is shown in FIG. 12, relative to the expanded bag 19 by common rotation of the sleeve 8 and the neck 16 about the center axis M, as is shown in FIG. 13. The sleeve 8 and the neck 16 jointly form a simple valve VT which can be repeatedly closed and opened.

A method for producing a structure according to the invention, in which an interior of a mold is evacuated to cause unfolding of balloons, includes for example the following preparations and steps:

Producing an airtight, dismountable mold or negative mold with apertures or holes for introducing sleeves or rotary nozzles and a suction pipe.

Preparing the mold by spraying the inner wall of the mold with a lubricant consisting, for example, of a mixture of water and flushing agent. This allows the balloons to slide steadily along one another and along the negative mold during expanding.

Introducing the balloons into the negative mold through the rotary nozzles and, in particular, subsequent outward reversing of the balloon lips or necks of the balloons over the rotary nozzle. In order further to improve the sliding of the balloons, provision is made to spray said balloon with the lubricant even before insertion.

The negative mold, which is fitted with rotary nozzles and balloons, is now placed onto a rubber mat. The balloons, which are fastened to the rotary nozzle resting on the rubber mat, are sealed by the rubber mat and cannot expand. Alternatively, some of the balloons which have not yet been expanded can also be closed by stoppers which are pressed into the sleeves.

A pump or vacuum pump draws the air out of the interior of the negative mold through the suction pipe.

The balloons, which are open to the environment, expand under the action of the reduced pressure which increases relative to an ambient pressure.

The expanded balloons are closed by rotating the rotary nozzles.

The negative mold is turned or the stoppers are removed from the sleeves and the process is repeated until all the balloons rest against one another and against the negative mold or until the balloons fill out the negative mold.

Each balloon can be vented as desired by deactivating the vacuum and/or briefly opening the balloons, by turning back the rotary nozzles. Other balloons can now expand as a result of the renewed switching-on of the vacuum pump and the opening of the balloons, by turning back the rotary nozzles. This process is repeated until the total volume of the interior of the mold has been distributed over the individual balloons in the desired manner.

Subsequently, the upwardly pointing rotary nozzles are opened, while the pump continues to operate. The individual balloons are filled through their balloon necks with the desired material and closed, after filling, by renewed rotation of the rotary nozzle. This process is carried out in all the balloons.

Once all the balloons have been filled, the vacuum pump is switched off. The material can now harden in the balloons.

After the hardening of the filling material, the rotary nozzles are drawn out of the holes of the mold. In the process, the balloon neck, along with the rotary nozzle, is in each case separated from the balloon. The negative mold is opened and the balloons, with the bodies hardened therein, are removed. The balloons are then stripped from the individual bodies.

Figure 14:
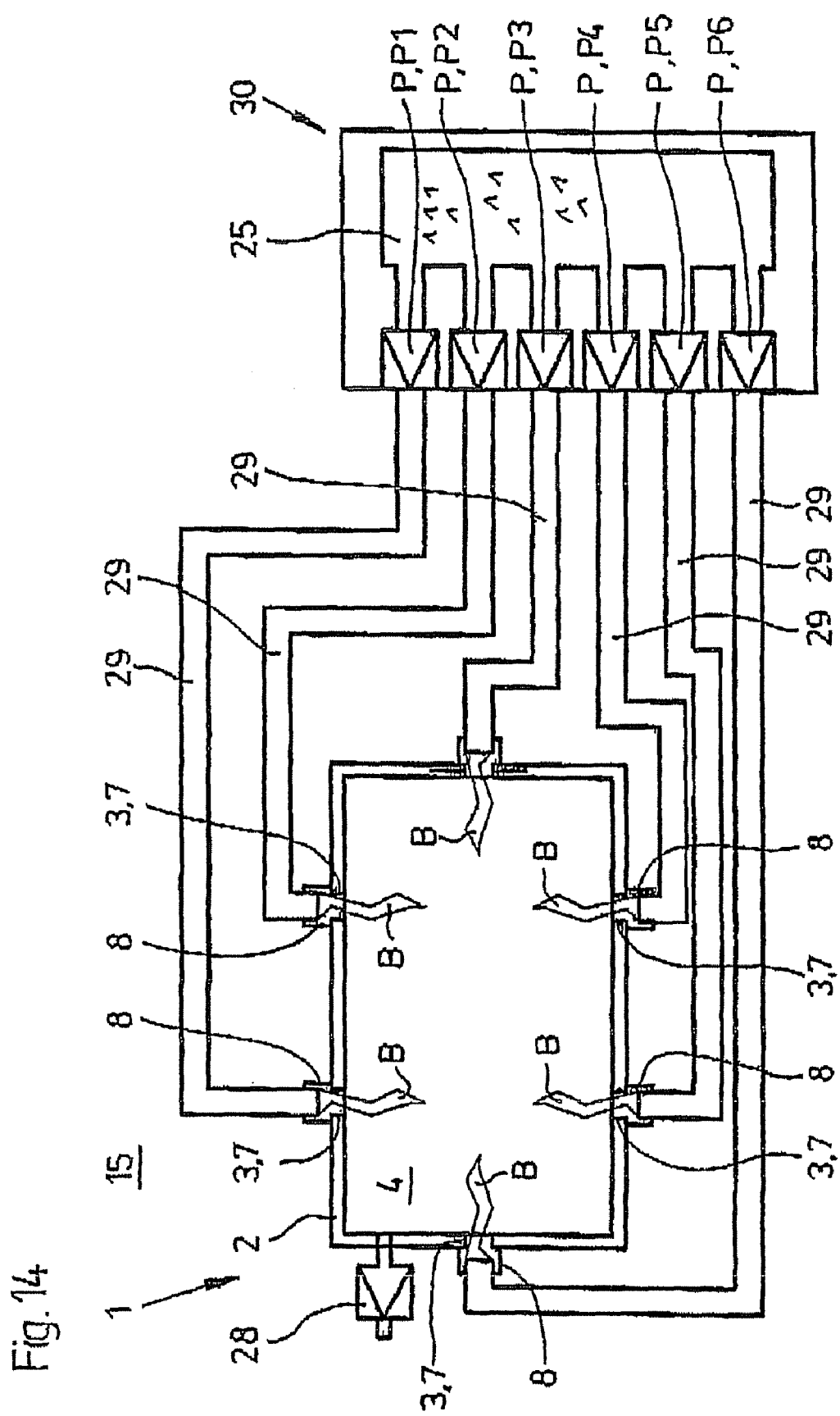
FIGS. 14-18 are schematic views of a second device at different moments of the production process.
Figure 15:
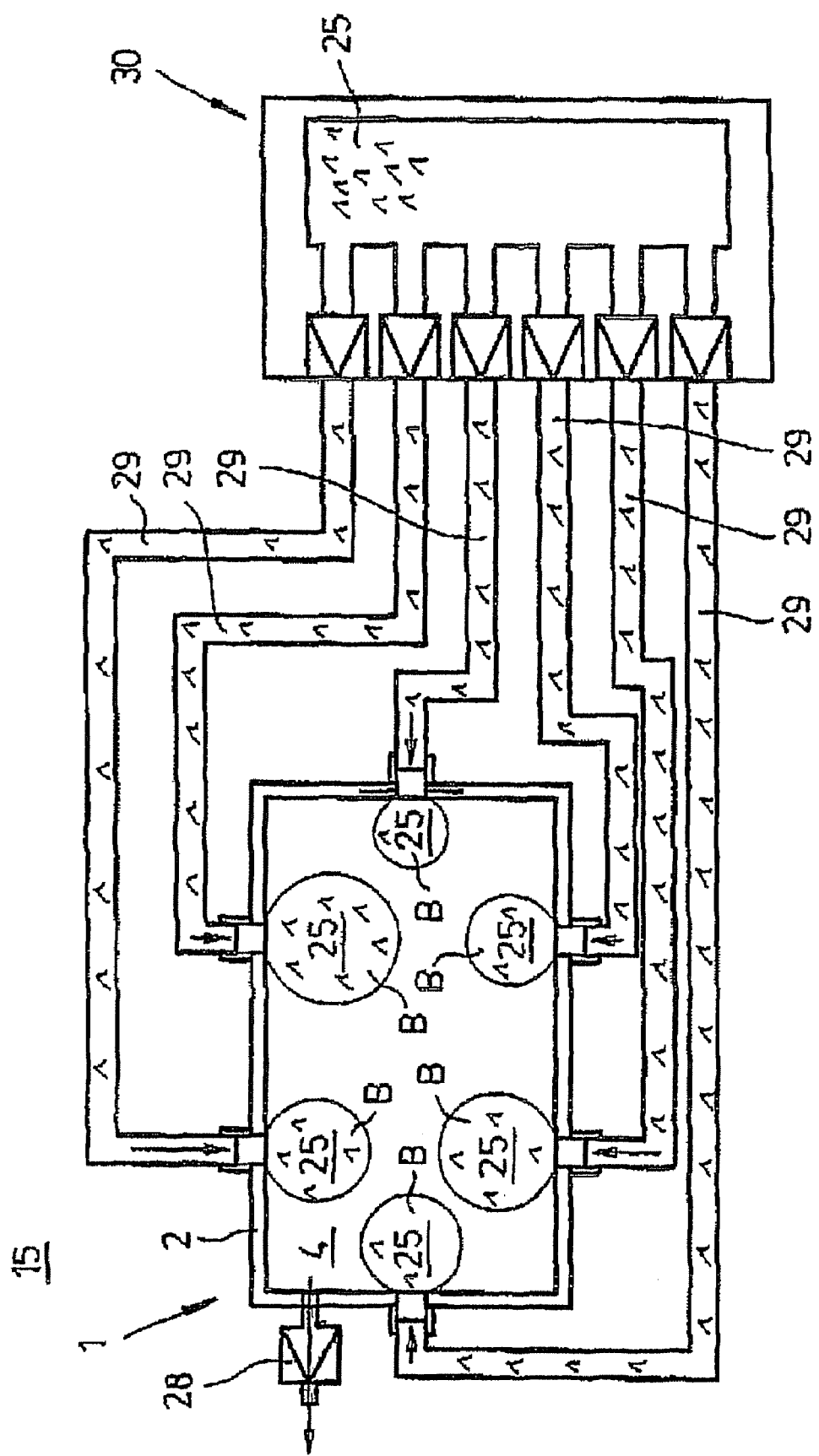
Figure 16:
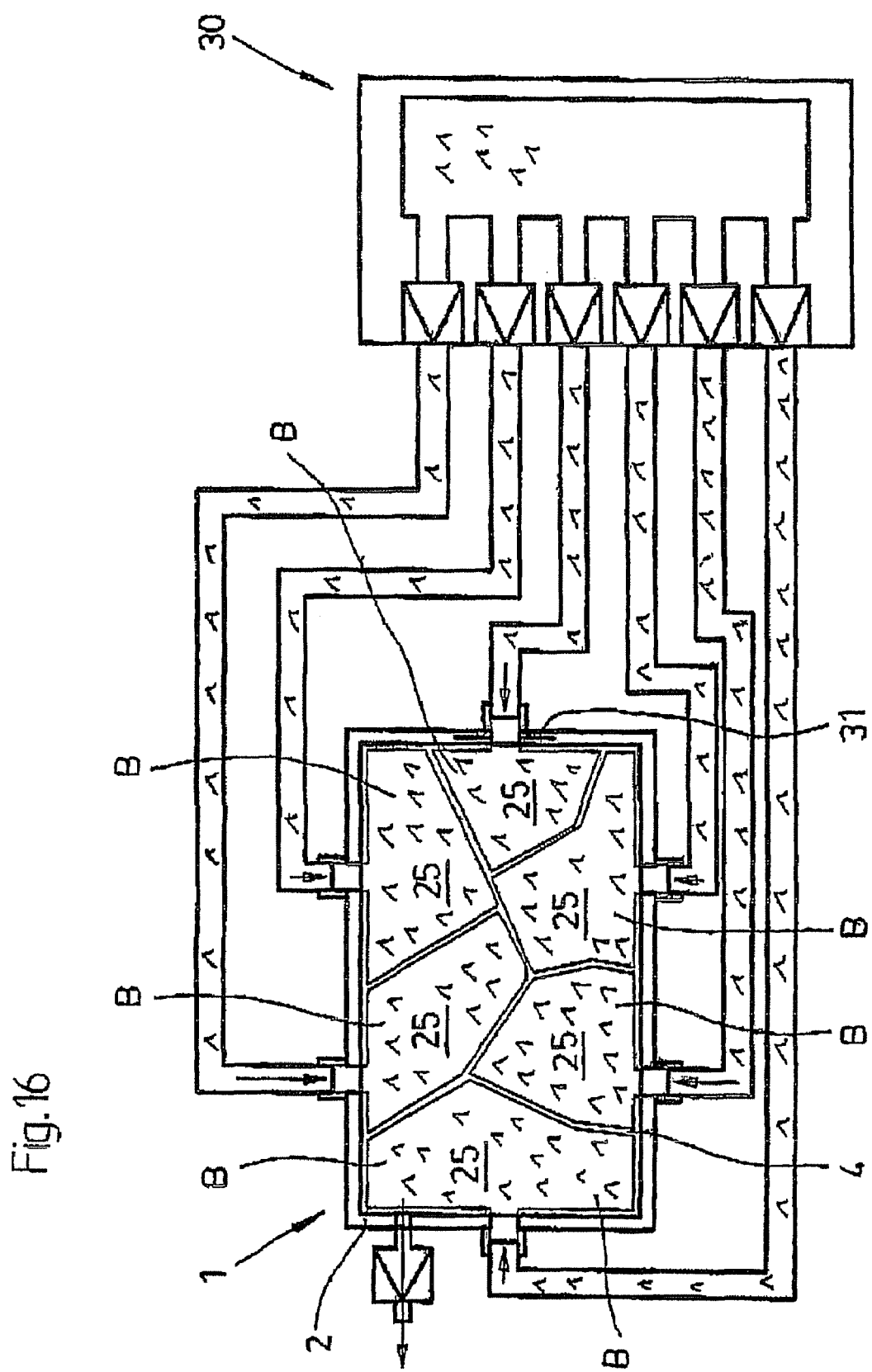
Figure 17:
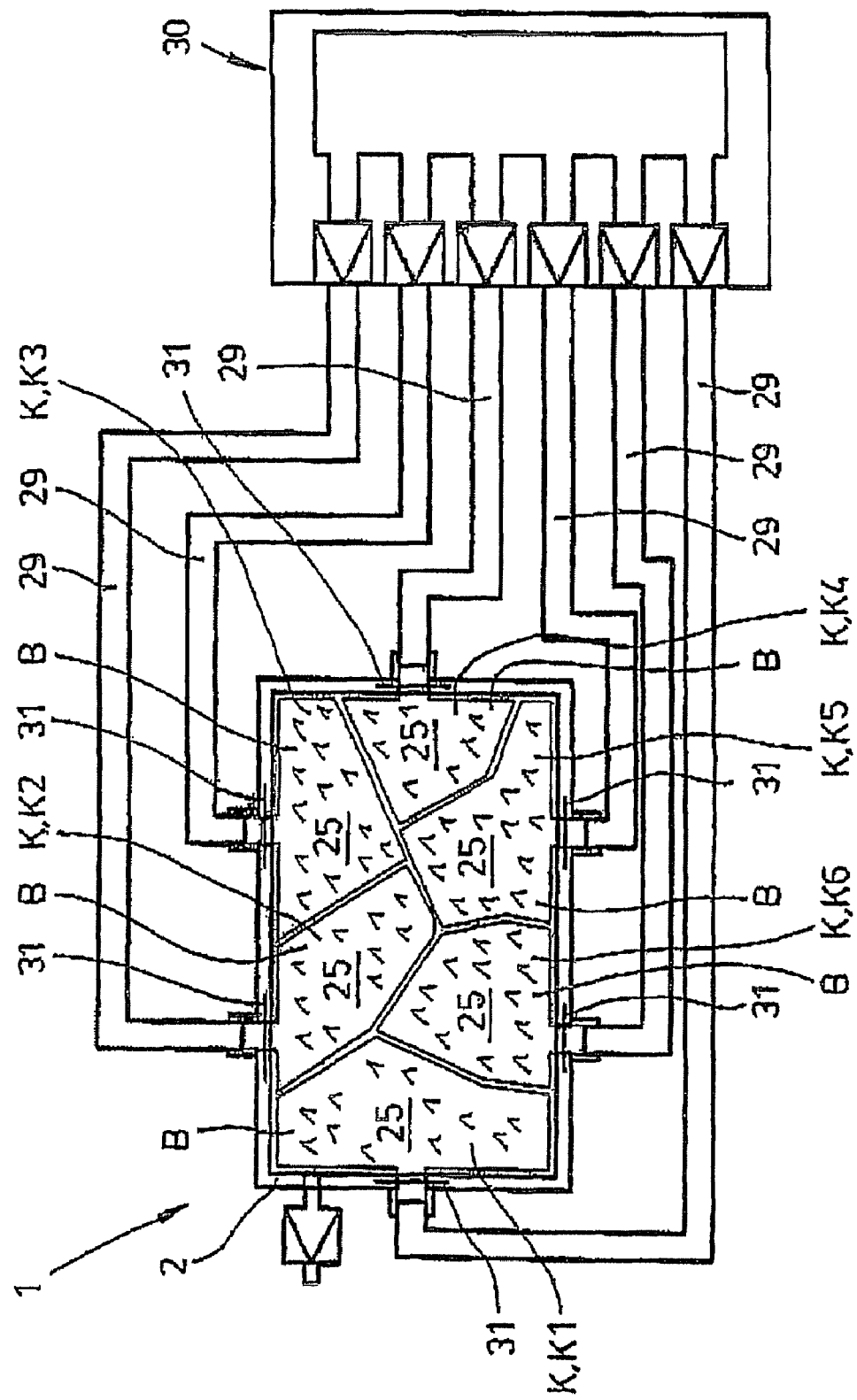
Figure 18:
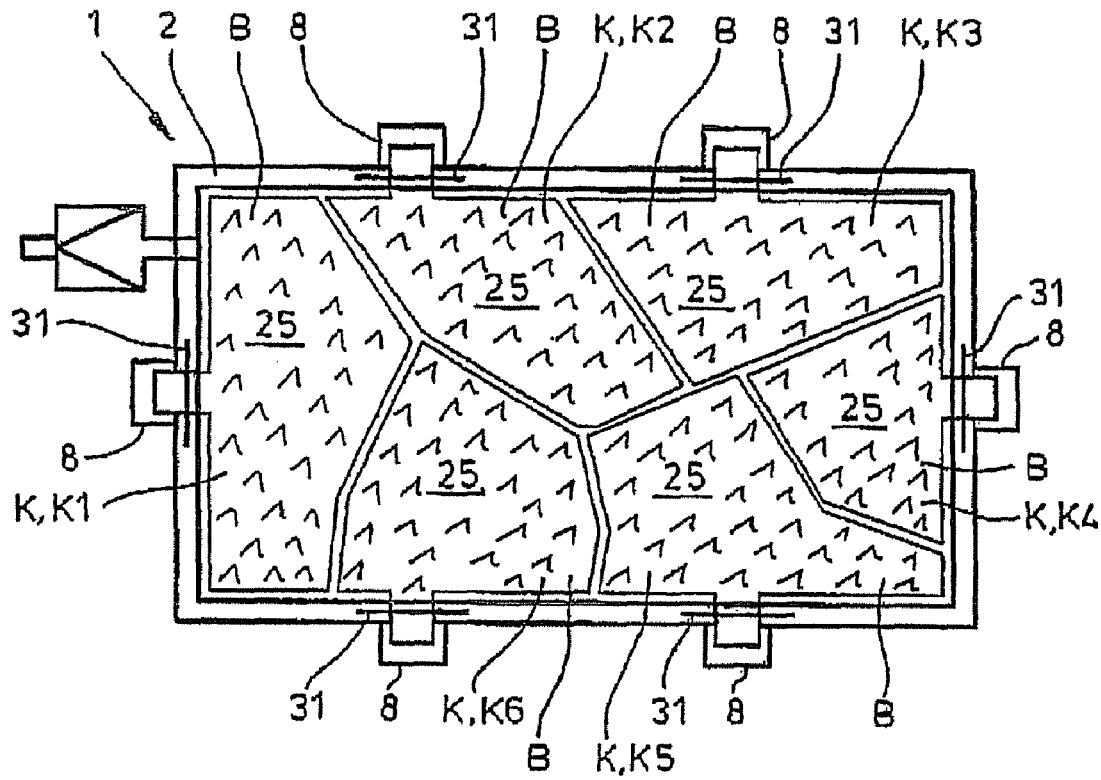

FIGS. 14 to 18 are schematic views of a second device 1 at different moments of the production process. The device 1 comprises substantially a mold 2 surrounding a cavity 4 on all sides. The cavity 4 is accessible via apertures 3. The apertures are designed as through-holes 7. Sleeves 8, into which balloons B can be clamped, can be inserted into the apertures 3. With regard to the fastening of the balloons B to the sleeves 8, reference is made in particular to FIGS. 10 and 11 and the associated description. Furthermore, the device comprises a valve 28 via which air can escape from the cavity 4 into an environment 15. The sleeves 8 or balloons B of the device 1 are connected to a pump device 30 by means of hoses 29, a pump P or P1 to P6 being associated with each hose 29 in order to pump a hardenable material 25 into the balloons B at predeterminable moments or for predeterminable periods at an individually controllable pressure or individually controllable volume flow. FIG. 14 shows the completely prepared device 1 in which all the apertures 3 are fitted with sleeves 8 and balloons B and which is already connected to the pump device 30. FIG. 15 shows the device 1 with the pump device 30 operating. The hardenable material 25, for example liquid paraffin, which hardens during cooling, is pumped into the balloons B via the hoses 29. In this case, the balloons B expand and displace air out of the interior 4 of the mold 2 through the valve 28. FIG. 16 shows the device 1 further on in the course of the production process; the balloons B are now filled to the extent that the interior 4 of the mold is almost completely filled out by the balloons B or the hardenable material 25 conveyed into the balloons B. FIG. 17 then shows, in accordance with the further progress of the production process, how the completely filled balloons B are closed in the region of their necks 19 by automatically actuatable shut-off slides 31. Subsequently, the hoses 29 of the pump device 30 can be separated from the device 1, as leaking of the balloons B is effectively prevented by the shut-off slides 31 (see FIG. 18). The balloons B and bodies K and K1 to K6 respectively, which are produced in the balloons B from the medium 25, remain in the mold 2 until the medium 25 has completely hardened.

Figure 19:
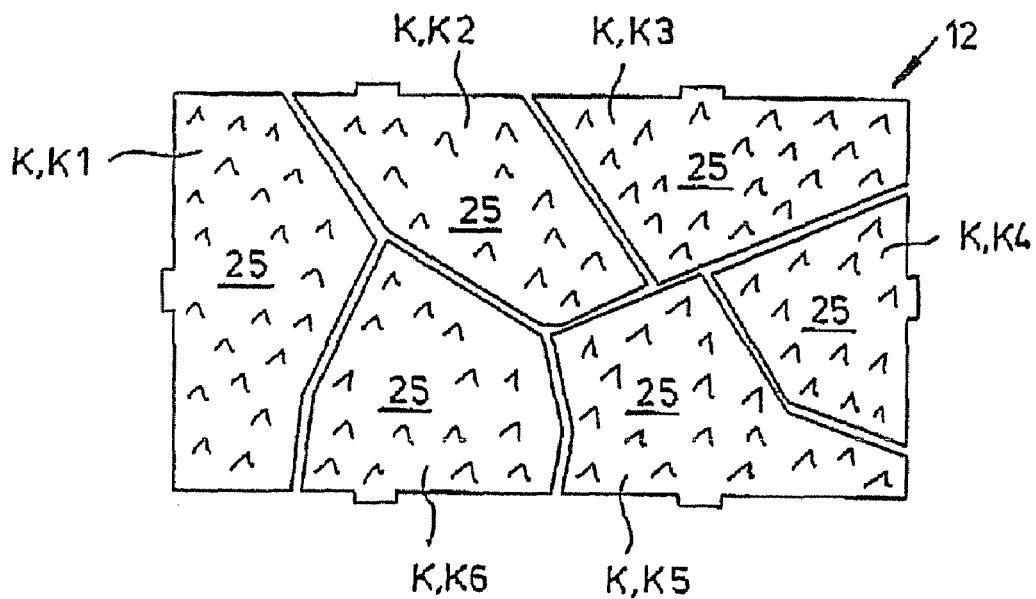
FIG. 19 shows a structure produced using the second device.

FIG. 19 shows a structure 12 which is produced using the second device 1 and is present after the hardening of the medium 25, the subsequent removal from the mold and the withdrawal of the balloons. The structure 12 can now be broken down into the individual solid bodies K and K1 to K6 respectively and be reassembled therefrom. A broad range of structures 12 may thus be produced, using the same device, as a function of the parameters prevailing during filling of the balloons.

A method for producing a structure according to the invention, in which a hardenable material is pressed into the balloons in order to cause unfolding of balloons, includes, for example, the following preparations and steps:

Producing a tight mold or negative mold with sleeves and rotary nozzles for the inserting and closing of balloons.

Introducing the balloons into the interior of the mold from the outside through the rotary nozzles.

Fastening the balloons to the rotary nozzle, in particular by placing the respective balloon neck over the rotary nozzle.

Pressing the desired, hardenable material into the balloons until the balloons fill the interior and rest against the inner walls of the negative mold.

Closing the filled balloons by rotating the respective rotary nozzle with the balloon neck.

After the hardening of the filling material to form solid bodies, the rotary nozzles are drawn out of the holes of the negative mold and in this case the balloon neck is separated, along with the rotary nozzle, from the respective balloon. The negative mold is opened and the balloons, with the bodies contained therein, are removed from the mold. The balloons are stripped from the individual bodies.

Figure 20:
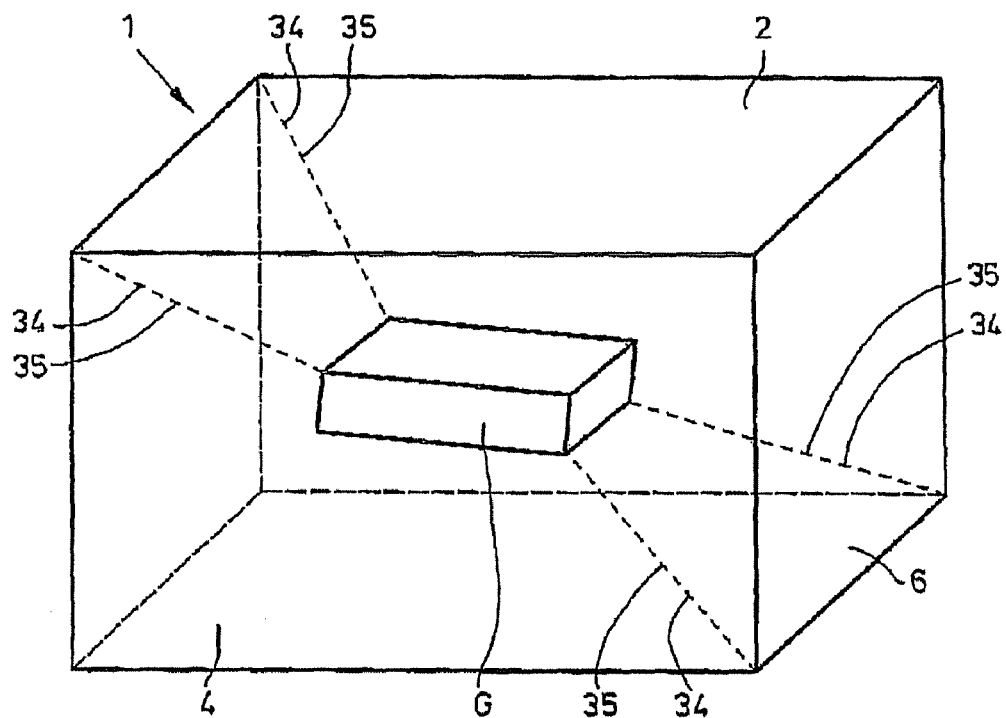
FIGS. 20, 21 show a device in which an article is suspended in the mold.
Figure 21:
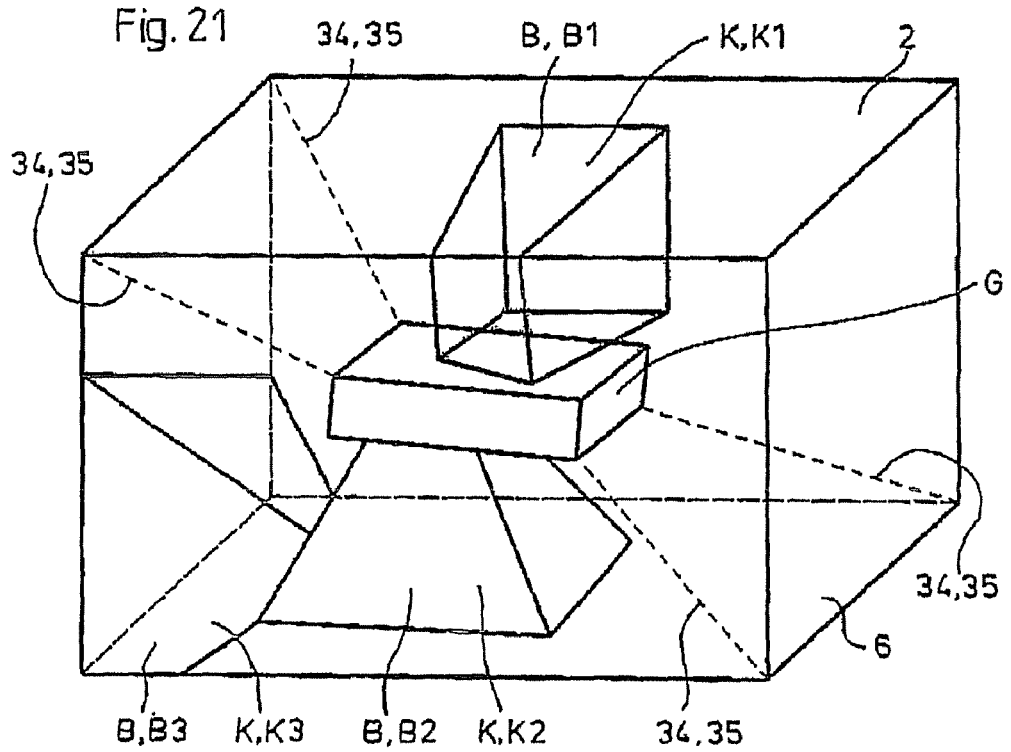

FIG. 20 is a perspective view of a device 1. The device 1 comprises a mold 2 having a cavity 4. In order to simplify the illustration, the wall 6 of the mold 12 is shown transparent. Furthermore, in order to simplify the illustration, through-holes, through which the necks of balloons are guided, have not been shown. An article G is suspended in the cavity 4 via fastening means 34; the article G does not touch the wall 6 of the mold 2. The article G is therefore held by the fastening means 34, which are embodied as threads 35, so as to hover freely in the cavity 4. Once the article G has been suspended in the cavity 4, balloons (not shown) are introduced through the through-holes (not shown) in the wall 6 and filled. The balloons being filled are then placed between the wall 6 of the mold 2 and the article G and embed said article. FIG. 21 is a schematic view showing how the article G is embedded by three bodies K and K1 to K3 respectively illustrated by way of example, the bodies K and K1 to K3 respectively still being in their balloons B, B1 to B3. The article G can be embodied, for example, as soap or as a sensitive optical component or as a liquid container or as a food product. Furthermore, provision is made to embed a metallic article and to fit the bodies, during the production process or after the production process, with magnets on their surfaces of contact with the article. This allows cohesion to be attained between the article and the bodies surrounding said article. According to a variant embodiment, provision is also made to make the article magnetic and to make the bodies magnetic and/or metallic on their contact surfaces.

The invention is not limited to the illustrated or described exemplary embodiments. On the contrary, it embraces developments of the invention within the scope of the claims. In particular, the invention also makes provision for the wall of the mold to be made with windows or from a transparent material such as, for example, acrylic glass. This allows the expansion process of the balloons to be observed, so that it is possible to intervene in a regulatory manner in the event of undesirable expansion behavior of one or more balloons. Furthermore, provision is made to embed components, such as for example magnets, into the balloons. This allows cohesion of a structure to be reliably ensured in different positions. Furthermore, pairs of magnets, which are distributed over two adjacent bodies, can facilitate assembly of the structure when the magnets of the pair of magnets attract each other when the bodies are positioned correctly.

LIST OF REFERENCE NUMERALS

1 Device
2 Mold
3 Aperture
4 Cavity, interior
5 Cube
6 Wall
7 Through-hole
8 Sleeve
9 Collar of 8
10 Groove on 8
11 Shoulder on 8
12 Structure
13 Surface region of K or K1 to K5
14 Elastic ring seal on 2
15 Environment
16 Neck of B or B1 to B5
17 Opening of B
18 Ring of B
19 Bag of B
20 Pump
21 Interior of B
22 Rubber plate
23 Outer skin of B
24 Inner wall of 2
25 Hardenable medium
26 Pipe
27 Gap between 16 and 26
28 Valve on 2
29 Hose from 8 to 30
30 Pump device
31 Shut-off slide in 2
32 Magnet
33 Magnet
34 Fastening means
25 Thread
B, B1-B6 Balloon
d8, D8 Diameter of 8
G Article
K, K1-K6 Body
K113 Surface region of K3
K213 Surface region of K2

M Center axis of 8 or 16
MP1-MP3 Pair of magnets
P Pressure in 4
P Pump
P1-P6 Pump
V1-V5 Volume of B
VT Valve made up of 8 and 16

I claim:

1. A method for producing a structure comprising a plurality of bodies, wherein mutually contacting surface regions of the bodies are adapted to conform to a shape of one another in their design, each body being produced at the same time in a respective elastic balloon, and each elastic balloon being arranged at the same time during the production of the bodies in a cavity of a mold defining the structure, wherein necks of at least some of the elastic balloons are guided out of the cavity of the mold through apertures in a wall of the mold, and the respective elastic balloons are filled from outside the mold with a hardenable medium through the respective necks.

2. The method of claim 1, wherein the necks of the balloons are closed after filling.

3. The method of claim 1, wherein the balloons are withdrawn from the bodies after hardening of said bodies.

4. The method of claim 1, wherein the balloons are filled at pressure.

5. The method of claim 4, wherein the balloons are filled at a pressure of 0.2 bar to 0.6 bar.

6. The method of claim 1, wherein a vacuum is generated in the cavity of the mold.

7. The method of claim 6, wherein the cavity of the mold is evacuated to a pressure below atmospheric pressure.

8. The method of claim 1, wherein the mold is closed prior to filling of the balloons.

9. The method of claim 1, wherein the balloons are introduced prior to filling through the apertures of the mold.

10. The method of claim 1, wherein at least one article, which is at least partially surrounded by the bodies during filling of said bodies, is positioned in the mold.

11. The method of claim 7, wherein the pressure is at least 200 mbar.

* * * * *